US011420985B2

(12) United States Patent
Knott et al.

(10) Patent No.: US 11,420,985 B2
(45) Date of Patent: Aug. 23, 2022

(54) ACETOXY SYSTEMS

(71) Applicant: Evonik Operations GmbH, Essen (DE)

(72) Inventors: Wilfried Knott, Essen (DE); Horst Dudzik, Essen (DE); Philippe Favresse, Ratingen (DE)

(73) Assignee: Evonik Operations GmbH, Essen (DE)

(*) Notice: Subject to any disclaimer, the term of this patent is extended or adjusted under 35 U.S.C. 154(b) by 84 days.

(21) Appl. No.: 16/849,106

(22) Filed: Apr. 15, 2020

(65) Prior Publication Data
US 2020/0377525 A1  Dec. 3, 2020

(30) Foreign Application Priority Data
May 28, 2019 (EP) .................................. 19176876

(51) Int. Cl.
*C08G 77/10* (2006.01)
*C07F 7/08* (2006.01)
*C08G 77/12* (2006.01)
*C08G 77/18* (2006.01)
*C08G 77/00* (2006.01)
C08G 77/08 (2006.01)

(52) U.S. Cl.
CPC ............ *C07F 7/0878* (2013.01); *C08G 77/10* (2013.01); *C08G 77/12* (2013.01); *C08G 77/18* (2013.01); *C08G 77/70* (2013.01); C08G 77/08 (2013.01)

(58) Field of Classification Search
CPC ......... C08G 77/08; C08G 77/10; C08G 77/14
See application file for complete search history.

(56) References Cited

U.S. PATENT DOCUMENTS

| 3,322,722 | A | * | 5/1967 | Eynon .................... C08G 77/08 528/23 |
| 3,346,610 | A | * | 10/1967 | Omietanski ............ C08G 77/14 556/442 |
| 4,066,680 | A | | 1/1978 | Lewis et al. |
| 4,177,201 | A | * | 12/1979 | de Montigny .......... C08G 77/14 556/416 |
| 4,260,715 | A | * | 4/1981 | de Montigny .......... C08G 77/08 556/453 |
| 4,281,144 | A | * | 7/1981 | de Montigny .......... C08G 77/14 556/416 |
| 5,346,968 | A | | 9/1994 | Haas |
| 6,521,771 | B2 | | 2/2003 | Frommeyer et al. |
| 6,659,162 | B2 | | 12/2003 | Frommeyer et al. |
| 6,854,506 | B2 | | 2/2005 | Knott et al. |
| 6,858,663 | B2 | | 2/2005 | Knott et al. |
| 6,874,562 | B2 | | 4/2005 | Knott et al. |
| 6,915,834 | B2 | | 7/2005 | Knott et al. |
| 6,942,716 | B2 | | 9/2005 | Knott et al. |
| 7,125,585 | B2 | | 10/2006 | Dudzik et al. |
| 7,196,153 | B2 | | 3/2007 | Burkhart et al. |
| 7,598,334 | B2 | | 10/2009 | Ferenz et al. |
| 7,612,158 | B2 | | 11/2009 | Burkhart et al. |
| 7,612,159 | B2 | | 11/2009 | Burkhart et al. |
| 7,619,035 | B2 | | 11/2009 | Henning et al. |
| 7,645,848 | B2 | | 1/2010 | Knott et al. |
| 7,754,778 | B2 | | 7/2010 | Knott et al. |
| 7,825,205 | B2 | | 11/2010 | Knott et al. |
| 7,825,206 | B2 | | 11/2010 | Neumann et al. |
| 7,825,209 | B2 | | 11/2010 | Knott et al. |
| 7,838,603 | B2 | | 11/2010 | Schwab et al. |
| 8,138,294 | B2 | | 3/2012 | Henning et al. |
| 8,247,525 | B2 | | 8/2012 | Schubert et al. |
| 8,268,939 | B2 | | 9/2012 | Ebbrecht et al. |
| 8,283,422 | B2 | | 10/2012 | Schubert et al. |
| 8,309,664 | B2 | | 11/2012 | Knott et al. |
| 8,309,673 | B2 | | 11/2012 | Schubert et al. |
| 8,324,325 | B2 | | 12/2012 | Knott et al. |

(Continued)

FOREIGN PATENT DOCUMENTS

| CA | 1125780 | | 6/1982 |
| DE | 1039516 | * | 9/1958 |

(Continued)

OTHER PUBLICATIONS

European Search Report dated Nov. 14, 2019 in EP 19176876.1 (7 pages).
Fiedel et al., U.S. Appl. No. 16/648,345, filed Mar. 18, 2020.
Knott et al., U.S. Appl. No. 17/297,372, filed May 26, 2021.
Knott et al., U.S. Appl. No. 17/476,417, filed Sep. 15, 2021.
Knott et al., U.S. Appl. No. 17/145,558, filed Jan. 11, 2021.
Knott et al., U.S. Appl. No. 17/239,011, filed Apr. 23, 2021.
R. Minkwitz, T. Hertel, Z. Naturforsch. B, vol. 52 (10), pp. 1283-1286 (4 pages).
S. Bruckenstein and I.M. Kolthoff, "Acid Base Equilibria in Glacial Acetic Acid. III. Acidity Scale. Potentiometric Determination of Dissociation Constants of Acids, Bases and Salts," J. Am. Chem. Soc. 78, 1 and ibid. 10 (1956) (6 pages).

(Continued)

*Primary Examiner* — Margaret G Moore
(74) *Attorney, Agent, or Firm* — Taylor English Duma LLP; Philip P. McCann

(57) ABSTRACT

Reaction system for preparing acetoxy function-bearing siloxanes having chain lengths of more than 3 silicon atoms, comprising silanes and/or siloxanes bearing alkoxy groups, silanes and/or siloxanes bearing acetoxy groups, silanes and/or siloxanes bearing hydroxy groups and/or simple siloxane cycles and/or DT cycles, and also a reaction medium comprising acetic anhydride, Brønsted acid and acetic acid, wherein Brønsted acids having a pKa ≤−1.30 are used, and wherein the acetic acid is present in the reaction system in amounts of 0.4 to 15.0 percent by weight, based on the reaction system, wherein the molar ratio of Brønsted acid used to acetic acid is in a defined range, with the proviso that either the sole use of trifluoromethanesulfonic acid and also of trifluoromethanesulfonic acid and acetic acid is excluded, and/or that the Brønsted acid used at least in part has a pKa between −1.3 and >−13.5.

15 Claims, No Drawings

(56) References Cited

U.S. PATENT DOCUMENTS

| | | |
|---|---|---|
| 8,334,355 B2 | 12/2012 | Henning et al. |
| 8,349,907 B2 | 1/2013 | Henning et al. |
| 8,420,748 B2 | 4/2013 | Henning et al. |
| 8,450,514 B2 | 5/2013 | Schubert et al. |
| 8,455,603 B2 | 6/2013 | Ferenz et al. |
| 8,557,944 B2 | 10/2013 | Henning et al. |
| 8,598,295 B2 | 12/2013 | Henning et al. |
| 8,609,798 B2 | 12/2013 | Knott et al. |
| 8,623,984 B2 | 1/2014 | Henning et al. |
| 8,722,834 B2 | 5/2014 | Knott et al. |
| 8,722,836 B2 | 5/2014 | Knott et al. |
| 8,729,207 B2 | 5/2014 | Hartung et al. |
| 8,772,423 B2 | 7/2014 | De Gans et al. |
| 8,778,319 B2 | 7/2014 | Herrwerth et al. |
| 8,779,079 B2 | 7/2014 | Henning et al. |
| 8,796,198 B2 | 8/2014 | Henning et al. |
| 8,802,744 B2 | 8/2014 | Knott et al. |
| 8,841,400 B2 | 9/2014 | Henning et al. |
| 8,921,437 B2 | 12/2014 | Knott et al. |
| 8,946,369 B2 | 2/2015 | Henning et al. |
| 8,957,009 B2 | 2/2015 | Schubert et al. |
| 8,969,502 B2 | 3/2015 | Knott et al. |
| 8,974,627 B2 | 3/2015 | Schubert et al. |
| 8,993,706 B2 | 3/2015 | Schubert et al. |
| 9,005,361 B2 | 4/2015 | Henning et al. |
| 9,035,011 B2 | 5/2015 | Ferenz et al. |
| 9,068,044 B2 | 6/2015 | Schubert et al. |
| 9,115,335 B2 | 8/2015 | Trosin et al. |
| 9,315,614 B2 | 4/2016 | Schubert et al. |
| 9,334,354 B2 | 5/2016 | Ferenz et al. |
| 9,353,225 B2 | 5/2016 | Knott et al. |
| 9,481,695 B2 | 11/2016 | Knott et al. |
| 9,540,500 B2 | 1/2017 | Ferenz et al. |
| 9,695,202 B2 | 7/2017 | Henning et al. |
| 9,738,797 B2 | 8/2017 | Niewski et al. |
| 9,783,635 B2 | 10/2017 | Schubert et al. |
| 9,783,656 B2 | 10/2017 | Lehmann et al. |
| 9,845,391 B2 | 12/2017 | Lehmann et al. |
| 9,868,699 B2 | 1/2018 | Nitz et al. |
| 9,878,979 B2 | 1/2018 | Nitz et al. |
| 9,896,541 B2 | 2/2018 | Fiedel et al. |
| 9,975,909 B2 | 5/2018 | Schubert et al. |
| 10,010,838 B2 | 7/2018 | Favresse et al. |
| 10,087,278 B2 | 10/2018 | Fiedel et al. |
| 10,093,605 B2 | 10/2018 | Bajus et al. |
| 10,099,211 B2 | 10/2018 | Knott et al. |
| 10,106,649 B2 | 10/2018 | Fiedel et al. |
| 10,266,658 B2 | 4/2019 | Henning et al. |
| 10,392,340 B2 | 8/2019 | Rittsteiger et al. |
| 10,399,051 B2 | 9/2019 | Favresse et al. |
| 10,399,998 B2 | 9/2019 | Knott et al. |
| 10,407,592 B2 | 9/2019 | Amajjahe et al. |
| 10,414,871 B2 | 9/2019 | Knott et al. |
| 10,414,872 B2 | 9/2019 | Knott et al. |
| 10,519,280 B2 | 12/2019 | Knott et al. |
| 10,526,454 B2 | 1/2020 | Knott et al. |
| 10,544,267 B2 | 1/2020 | Knott et al. |
| 10,577,512 B2 | 3/2020 | Aitha et al. |
| 10,787,464 B2 | 9/2020 | Fiedel et al. |
| 10,954,344 B2 | 3/2021 | Knott et al. |
| 11,021,575 B2 | 6/2021 | Knott et al. |
| 11,066,429 B2 | 7/2021 | Knott et al. |
| 2002/0161158 A1 | 10/2002 | Burkhart et al. |
| 2007/0128143 A1 | 6/2007 | Gruning et al. |
| 2008/0125503 A1 | 5/2008 | Henning et al. |
| 2009/0137752 A1 | 5/2009 | Knott et al. |
| 2010/0022435 A1 | 1/2010 | Henning et al. |
| 2010/0029587 A1 | 2/2010 | Brueckner et al. |
| 2010/0081781 A1 | 4/2010 | Schubert et al. |
| 2011/0144269 A1 | 6/2011 | Kuppert et al. |
| 2011/0230619 A1 | 9/2011 | Kuppert et al. |
| 2011/0301254 A1 | 12/2011 | Knott et al. |
| 2011/0306694 A1 | 12/2011 | Glos et al. |
| 2012/0037036 A1 | 2/2012 | Veit et al. |
| 2012/0068110 A1 | 3/2012 | Schubert et al. |
| 2012/0190760 A1 | 7/2012 | Henning et al. |
| 2012/0190762 A1 | 7/2012 | Hubel et al. |
| 2012/0282210 A1 | 11/2012 | Henning et al. |
| 2013/0041115 A1 | 2/2013 | Knott et al. |
| 2013/0213267 A1 | 8/2013 | Fiedel et al. |
| 2013/0259821 A1 | 10/2013 | Henning et al. |
| 2013/0345318 A1 | 12/2013 | Schubert et al. |
| 2014/0256844 A1 | 9/2014 | Henning et al. |
| 2014/0309446 A1 | 10/2014 | Amajjahe et al. |
| 2015/0004112 A1 | 1/2015 | Ritter et al. |
| 2015/0004113 A1 | 1/2015 | Ritter et al. |
| 2016/0130402 A1 | 5/2016 | Schubert et al. |
| 2017/0198099 A1 | 7/2017 | Knott |
| 2018/0016392 A1 | 1/2018 | Lobert et al. |
| 2018/0155264 A1 | 6/2018 | Bajus et al. |
| 2018/0258228 A1 | 9/2018 | Amajjahe et al. |
| 2018/0305596 A1 | 10/2018 | Schubert et al. |
| 2019/0031880 A1 | 1/2019 | Cavaleiro et al. |
| 2019/0100625 A1 | 4/2019 | Knott et al. |
| 2019/0106369 A1 | 4/2019 | Schubert et al. |
| 2019/0106441 A1 | 4/2019 | Knott et al. |
| 2019/0112502 A1 | 4/2019 | Sloot et al. |
| 2019/0194488 A1 | 6/2019 | Favresse et al. |
| 2019/0345101 A1 | 11/2019 | Cameretti et al. |
| 2020/0055991 A1 | 2/2020 | Knott et al. |
| 2020/0055992 A1 | 2/2020 | Knott et al. |
| 2020/0216474 A1 | 7/2020 | Fiedel et al. |
| 2020/0339612 A1 | 10/2020 | Knott et al. |
| 2020/0377524 A1 | 12/2020 | Knott et al. |
| 2020/0377660 A1 | 12/2020 | Knott et al. |
| 2020/0377665 A1 | 12/2020 | Knott et al. |
| 2020/0377666 A1 | 12/2020 | Knott et al. |
| 2020/0377686 A1 | 12/2020 | Knott et al. |
| 2020/0385528 A1 | 12/2020 | Knott |
| 2021/0130551 A1 | 5/2021 | Knott et al. |
| 2021/0163687 A1 | 6/2021 | Knott et al. |
| 2021/0171719 A1 | 6/2021 | Knott et al. |
| 2021/0206972 A1 | 7/2021 | Schulz et al. |
| 2021/0253780 A1 | 8/2021 | Wessely et al. |
| 2021/0253799 A1 | 8/2021 | Knott et al. |
| 2021/0301099 A1 | 9/2021 | Knott et al. |

FOREIGN PATENT DOCUMENTS

| | | |
|---|---|---|
| EP | 0 453 882 A2 | 10/1991 |
| EP | 3 492 513 A1 | 6/2019 |
| EP | 3 611 215 A1 | 2/2020 |
| JP | H11 27389 A | 8/1999 |
| WO | 02/060621 A2 | 8/2002 |
| WO | 02/094483 A2 | 11/2002 |
| WO | 2008/074564 A2 | 6/2008 |
| WO | 2010/046181 A2 | 4/2010 |
| WO | 2018/118926 A2 | 10/2010 |
| WO | 2013/010747 A1 | 1/2013 |
| WO | 2013/017365 A1 | 2/2013 |
| WO | 2015/003875 A1 | 1/2015 |
| WO | 2018/001889 A1 | 1/2018 |
| WO | 2019/076552 A1 | 4/2019 |
| WO | 2019/105608 A1 | 6/2019 |
| WO | 2019/192876 A1 | 10/2019 |
| WO | 2019/219446 A1 | 11/2019 |
| WO | 2019/219452 A1 | 11/2019 |

OTHER PUBLICATIONS

G.W. Ceska and E. Grunwald, "Equilibrium Constants and Substituent Effects in the Ionization of Aniline as a Base and the Ion-Pair Dissociation of Anilinium Acetate in Glacial Acetic Acid," J. Am. Chem. Soc. 89, 1371 and ibid. 1377 (1967) (6 pages).

J. Pola et al., "Mechanism of Reversible Cleavage of Acetoxysilanes to Siloxanes and Acetanhydride," Collect. Czech. Chem. Commun. 1974, 39(5), 1169-1176 (8 pages).

W. Simmler, Houben-Weyl, Methods of Organic Chemistry, vol. VI/2, 4th Edition, O-Metal Derivatives of Organic Hydroxy Compounds p. 162 ff.

(56) References Cited

OTHER PUBLICATIONS

Benet L.Z., Goyan J.E., "Potentiometric Determination of Dissociation Constants," J. Pharm. Sci. 56, 665-680 (1967) (16 pages).

* cited by examiner

ACETOXY SYSTEMS

CROSS REFERENCE TO RELATED APPLICATIONS

This application is a 35 U.S.C. §119 patent application which claims the benefit of European Application No. 19176876.1 filed May 28, 2019, which is incorporated herein by reference in its entirety.

FIELD

The invention relates to acetoxy systems and to the use thereof in particular for preparing equilibrated acetoxy group-bearing siloxanes having chain lengths of more than 3 silicon atoms and also to the use thereof for preparing SiOC-based silicon compounds, especially for preparing SiOC-based polyethersiloxanes.

BACKGROUND

DE 1039516 (Bailey et al.) teaches a process for preparing short-chain acyloxysilicon compounds of the formula $X[RXSiO]_nSiX_2R$, where n is an integer from 0 to 2, R is an alkyl group and X is an alkyl or acyloxy group and at least one group identified with X is an acyloxy group, the process being based on heating a mixture of an alkylpolysiloxane and an aliphatic or aromatic monocarboxylic acid having 1 to 18 carbon atoms or its anhydride to 50 to 235° C., in particular to 100 to 200° C., in the presence of an acidic catalyst and continuously removing the water formed from the reaction mixture.

While the teaching of DE 1039516 (Bailey et al.) states that the amount of the monocarboxylic acid used is not critical and can be used in a range from 1.0 to 5 mol per gram atom of the silicon bound in the alkylsiloxane and that the equivalent amount of the corresponding acid anhydride can be used in place of all or a portion of the monocarboxylic acid, it has been found within the context of the present invention that surprisingly the amount of employed monocarboxylic acid, in particular acetic acid, contrary to expectations is actually of decisive importance for the achievable quality of the target acetoxy group-bearing siloxane having chain lengths of more than 3 silicon atoms.

As replicate experiments in respect of DE 1039516 show, it is possible to arrive at acetoxy group-bearing, linear polydimethylsiloxanes by way of the reaction of alkylpolysiloxanes, such as for example decamethylcyclopentasiloxane, with acetic anhydride in the presence of an acidic catalyst such as for example concentrated sulfuric acid. However, these α,ω-diacetoxypolydimethylsiloxanes have not yet attained the end-equilibrated state.

On the other hand, such replicate experiments also indicate that the reaction offered by Bailey et al. in DE 1039516 of alkylpolysiloxanes, such as for example decamethylcyclopentasiloxane, with acetic acid in the presence of an acidic catalyst, such as for example concentrated sulfuric acid, does not even lead to acetoxy group-bearing polydimethylsiloxanes.

The teaching from Bailey does not open up the route to structurally defined, end-equilibrated acetoxy group-comprising siloxanes.

SUMMARY

In the scope of comprehensive investigations, the inventors were able to discover that it is important to set a particular molar ratio of Brønsted acid to acetic acid in the reaction matrix consisting at least of siloxane raw material(s), acetic anhydride, acetic acid and Brønsted acid, which allows not only an acetoxy functionalization at the silicon but moreover also the targeted equilibration, in particular the end equilibration, of the resulting acetoxysiloxane to be ensured.

DETAILED DESCRIPTION

In this context, it has been found according to the invention and in a completely surprising way that, departing from the teaching encountered for example in the (as-yet unpublished) European application documents with the application references EP17204277.2 and EP18189073.2, which focuses on the use of trifluoromethanesulfonic acid in combination with acetic acid in reaction systems which additionally also comprise siloxane cycles and/or hydroxy-functional siloxanes, it is also possible to use Brønsted acids that are much weaker than trifluoromethanesulfonic acid (pKa=−13.6) to obtain equilibrated (preferably end-equilibrated) acetoxy group-bearing siloxanes.

Without wishing to be bound to any theory, it is assumed that the Brønsted acid first dissolves in acetic acid as a non-aqueous electrolyte, achieving the system acidity which is required for attaining the targeted equilibration, in particular end-equilibration, and which would not be attributed to it alone on the basis of its position in the Hammett acid strength series. It is thought that according to the invention an acetate acidium ion $CH_3C(OH)_2^+$ is formed, the existence of which has been detected elsewhere by the characterization of its crystal structure in the form of the hexafluoroantimonate $CH_3C(OH)_2^+SbF_6^-$ (R. Minkwitz, T. Hertel, Z. Naturforsch. B, vol. 52 (10), pp. 1283-1286). In this respect, the Hammett acid strength of the strong Brønsted acid used according to the invention, expressed as pKa, is a parameter which is necessary, but still in no way sufficient, for achieving the equilibration, in particular end-equilibration, targeted according to the invention.

The inventors assume that the catalytically active acid in the anhydrous acetylation system is always the acetate acidium ion $CH_3C(OH)_2^+$, which no doubt explains why the anhydrous acetylation system does not tolerate the existence of any stronger acids. It has furthermore been found that the pKa of the Brønsted acid used is an important parameter for the formation of this protonated acetic acid. The ion pair resulting from the protonation of the acetic acid with a Brønsted acid thus always contains the anion B⁻ of the Brønsted acid.

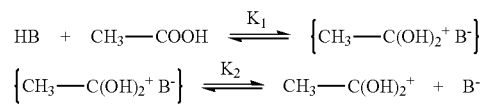

where HB=Brønsted acid

The inventors assume that the catalytic activity observed is a function of the degree of dissociation of this (acetate acidium cation-Brønsted acid anion) ion pair. The complexity of the relationships when predicting systemic acidity in acetic acid-Brønsted acid systems brought about by the linking of a proton transfer reaction from the Brønsted acid to acetic acid and then downstream dissociation of the ion pair formed in this way, is illustrated both by S. Bruckenstein and I. M. Kolthoff in J. Am. Chem. Soc. 78, 1 and ibid. 10 (1956) on the basis of their investigations of acid-base equilibria in acetic acid and by G. W. Ceska and E. Grunwald in J. Am. Chem. Soc. 89, 1371 and ibid. 1377 (1967), who investigate the equilibrium constants and substituent effects, inter alia, of substituted anilinium acetates in acetic acid.

Since the dissociation constant $K_2$ of the individual (acetate acidium cation-Brønsted acid anion) ion pair is not known, or rather it has to be accepted that it can at best be determined only with difficulty, within the context of the present invention it is assumed for simplification that the minimum concentration of free acetate acidium cation required for the intended catalytic activity is determined primarily by the concentration of bound acetate acidium cation present in the ion pair.

Since the concentration of bound acetate acidium cation present in the ion pair depends directly on the concentration of acetic acid, Brønsted acid and the individual pKa thereof, departing from all considerations of the physical and theoretical chemistry made here, according to the invention just a few exploratory manual experiments are therefore sufficient for a person skilled in the art to identify a suitable catalyst system consisting of acetic acid and Brønsted acid. Brønsted acids which can be mentioned and which are suitable within the context of the invention and allow the advantageous preparation of equilibrated (preferably end-equilibrated) linear and also branched siloxanes bearing acetoxy groups are especially the following:

protic acid having a pKa $\leq -1.30$, such as preferably nitric acid, methanesulfonic acid and/or para-toluenesulfonic acid, preferably protic acids having a pKa $\leq -2.90$, such as preferably sulfuric acid, particularly preferably protic acids having a pKa $\leq -4.90$, such as preferably perfluoroalkanesulfonic acids, such as in particular heptafluoropropanesulfonic acid, pentafluoroethanesulfonic acid, perchloric acid and/or chlorosulfonic acid, with perfluoroalkanesulfonic acids being especially preferred among these, and also in addition preferably ion-exchange resins having sulfonic acid groups and/or perfluoroalkylsulfonic acid groups, for example in the form of the commercially available types Amberlyst® and Lewatit® but also in the form of the resins having perfluoroalkylsulfonic acid groups such as Nafion® (for example here of the type NR 50).

Appropriate to the individual acid strength, according to the invention the molar ratio of Brønsted acid HB used to acetic acid should preferably then be,
for Brønsted acids having a pKa $\leq -4.90$,
in the range from $$1/30 \leq \frac{[HB]}{[CH_3-COOH]} \leq 1/3$$

and, for Brønsted acids having a pKa $\leq -1.30$ and $\geq -4.80$, in the range from $$1/10 \leq \frac{[HB]}{[CH_3-COOH]} \leq 1.$$

Brønsted acids having a pKa $\leq -4.90$ are referred to as Brønsted acids of the category A for the purposes of this invention. Brønsted acids having a pKa $\leq -1.30$ and $\geq -4.80$ are referred to as Brønsted acids of the category B for the purposes of this invention.

The expression "Brønsted acid" according to the invention comprises pure Brønsted acids having a pKa in particular between $\leq -1.3$ and $\geq -13.5$ but preferably also appropriate mixtures thereof.

According to the invention, therefore, the sole use of trifluoromethanesulfonic acid and also of trifluoromethanesulfonic acid and acetic acid is excluded, but it is very much preferable according to the invention to use mixtures of trifluoromethanesulfonic acid with other Brønsted acids, with the proviso that the Brønsted acid used here at least in part has a pKa between $\leq -1.3$ and $> -13.5$.

This inventive preference for the use of mixtures of trifluoromethanesulfonic acid is also explained by the experimental observation that with a virtually comparable molar ratio of Brønsted acid HB used to acetic acid such as for example (0.24 versus 0.213) in examples 5 and 6, the system which displays outstanding equilibration performance is always the one which contains in part the stronger Brønsted acid, here the trifluoromethanesulfonic acid (originating from the sodium triflate), in addition to the methanesulfonic acid (example 6), as opposed to sulfuric acid alone (example 5).

According to the invention, the Brønsted acid HB used is preferably mixtures of Brønsted acids of category A) and category B) in a molar ratio to acetic acid in the range from $\geq 1/30$ and $\leq 1$.

The inventors were also able to discover that in the process according to the invention the acetic anhydride concentration in the reaction system selected for the preparation of equilibrated (preferably end-equilibrated) acetoxy group-bearing siloxanes is preferably to be such that at every point in time water formed in the system is converted into acetic acid.

As experiments convincingly prove, strong Brønsted acids such as for example sulfuric acid (pKa=−3.0) and also trifluoromethanesulfonic acid (pKa=−13.6, N. Gigant, Synlett, 2013, 24, 0399-0400), which is considered to be a superacid, display the necessary system acidity as a result of the inventive addition of a certain amount of acetic acid in order to reach the preferred aim of the equilibration, in particular end-equilibration, even within a short reaction time, such as for example 6 hours. Superacids are generally considered to be acids which have a pKa=<−3.0, that is to say less than the pKa attributed to 100% sulfuric acid.

What is meant by the term "end-equilibrated" is that the equilibrium established at a temperature of 23° C. and a pressure of 1013.25 hPa has been attained. The indicator used for the attainment of the equilibrium may be the total cycles content determined by gas chromatography and defined as the sum total of the $D_4$, $D_5$ and $D_6$ contents, based on the siloxane matrix and ascertained after derivatization of the α,ω-diacetoxypolydimethylsiloxanes to give the corresponding α,ω-diisopropoxypolydimethylsiloxanes or after the derivatization of the branched acetoxysiloxanes to give the corresponding branched isopropoxysiloxanes. The inventive use of acetic acid makes it possible without difficulty to undershoot otherwise customary equilibrium proportions of about 13 percent by weight of total cycles content for the linear α,ω-diacetoxypolydimethylsiloxanes and of about 8 percent by weight of total cycles content for the branched acetoxysiloxanes. Accordingly, it corresponds to a particularly preferred embodiment of the present invention when equilibrium proportions of the total cycles content of less than 13, preferably less than 12 percent by weight for the linear α,ω-diacetoxypolydimethylsiloxanes and equilibrium proportions of the total cycles content of less than 8, preferably less than 7 percent by weight for the branched acetoxysiloxanes are undershot. The derivatization to give the α,ω-diisopropoxypolydimethylsiloxanes or the branched isopropoxysiloxanes is chosen here deliberately in order to prevent a thermally induced retrocleavage reaction of the α,ω-diacetoxypolydimethylsiloxanes or of the branched acetoxysiloxanes which may take place under the conditions of analysis by gas chromatography (regarding the retrocleavage reaction, see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, O-Metal Derivates of Organic Hydroxy Compounds p. 162 ff.).

The above findings are a constituent part of this invention.

The main subject matter of this invention is a reaction system for preparing acetoxy function-bearing siloxanes having chain lengths of more than 3 silicon atoms, comprising
   a) silanes and/or siloxanes bearing alkoxy groups and/or
   b) silanes and/or siloxanes bearing acetoxy groups, and/or
   c) silanes and/or siloxanes bearing hydroxy groups, and/or
   d) simple siloxane cycles and/or DT cycles, and also
   e) a reaction medium comprising acetic anhydride, Brønsted acid and acetic acid,
wherein Brønsted acids having a pKa ≤−1.30, preferably having a pKa ≤−2.90, particularly preferably having a pKa ≤−4.90 are used,
and wherein
the acetic acid is present in the reaction system in amounts of 0.4 to 15.0 percent by weight, with preference 0.5 to 10.0 percent by weight, preferably 0.8 to 6.5 percent by weight, particularly preferably in amounts of 1.0 to 6.0 percent by weight, based on the reaction system,
wherein the molar ratio of Brønsted acid used to acetic acid
   in the case of Brønsted acids of category A), which have a pKa ≤−4.90, is in the range from ≥1/30 and ≤1/3 and
   in the case of Brønsted acids of category B), which have a pKa of ≤−1.30 to ≥−4.80, is in the range from ≥1/10 and ≤1 and
   in the case of mixtures of Brønsted acids of category A) and category B) is in the range from ≥1/30 and ≤1,
with the proviso that (i) either the sole use of trifluoromethanesulfonic acid and also of trifluoromethanesulfonic acid and acetic acid is excluded, and/or that (ii) the Brønsted acid used at least in part has a pKa between ≤−1.3 and ≥−13.5.

Comprehensive compilations of the pKa values of Brønsted acids can be found in the literature and can be taken therefrom, for example CRC Handbook of Chemistry and Physics 99th edition, but also in electronic sources such as for example Evans pKa Table, evans.rc.fas.harvard.edu/pdf/evans_pKa_table.pdf and "Das Periodensystem der Elemente online, pKs-Werte absteigend nach Wert sortiert" [The Periodic Table of the Elements online, sorted in descending order of pKa], 2010-2019, ©René Rausch. In addition, the methods known to those skilled in the art are available for determining the pKa. Apart from possibly anomalously referenced pKa values, potentiometric titration proves to be a particularly suitable method for the exact determination of pKa values for the purposes of the present invention. This method is long-established, cf. for example Benet L. Z., Goyan J. E.: Potentiometric determination of dissociation constants; J. Pharm. Sci. 56, 665-680 (1967).

If mixtures of Brønsted acids, such as preferably of Brønsted acids of category A with Brønsted acids of category B, are used, this is a preferred embodiment of the invention. This also applies to the use of Brønsted acid salt-Brønsted acid combinations, which is described in more detail further below.

In a preferred embodiment of the invention, a reaction system according to the invention, provided for preparing branched siloxanes bearing terminal acetoxy functions, is characterized in that a silane and/or siloxane bearing alkoxy groups and containing at least one T and/or Q group, and/or a silane/siloxane bearing acetoxy groups and containing at least one T and/or Q group, and/or DT cycles are used.

When, within the context of the invention, alkoxysilanes are used, preferably dimethyldialkoxysilanes, methyltrialkoxysilanes and/or alkyl orthosilicates $Si(OR)_4$, where R=alkyl radical, branched alkyl radical or cycloalkyl radical, having 1 to 10, preferably having 1 to 4, carbon atoms, particularly preferably R=ethyl-, this is a further preferred embodiment of the invention.

When, within the context of the invention, linear and/or branched alkoxysilanes are used, preferably those of the formula:

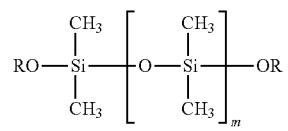

where m=1 to 300, preferably 12 to 150, particularly preferably m=20 to 80, or $$CH_3SiD_aD_bD_c(OR)_3$$

or $$SiD_aD_bD_cD_d(OR)_4$$

where a, b, c and d are each independently 1 to 100, preferably 2 to 50, particularly preferably 10 to 30 and R=alkyl radical, branched alkyl radical, cycloalkyl radical having 1 to 10, preferably having 1 to 4, carbon atoms, particularly preferably R=ethyl-, this is a further preferred embodiment of the invention.

When, within the context of the invention, the alkoxysiloxanes used result from acidic equilibration of dimethyldialkoxysilanes or methyltrialkoxysilanes with simple siloxane cycles (especially comprising $D_4$ and/or $D_5$), this is a further preferred embodiment of the invention.

When, within the context of the invention, simple siloxane cycles are used, especially comprising $D_3$ (hexamethylcyclotrisiloxane), $D_4$ (octamethylcyclotetrasiloxane), $D_5$ (decamethylcyclopentasiloxane) and/or $D_6$ (dodecamethylcyclohexasiloxane), where $D_4$ and/or $D_5$ are particularly preferred, and $D_5$ is most preferred, this is a further preferred embodiment of the invention.

When, within the context of the invention, hydroxy-functional silanes and/or hydroxy-functional siloxanes are used, preferably dimethylsilanol $(CH_3)_2Si(OH)_2$, methylsilanol $(CH_3Si(OH)_3)$ and/or orthosilicic acid $Si(OH)_4$, and/or the hydroxy-functional siloxanes used are preferably α,ω-polydimethylsiloxanediols of the following formula:

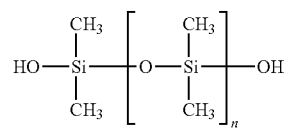

where n=1 to 300, preferably n=12 to 150, particularly preferably n=20 to 80, this is a further preferred embodiment of the invention.

When, within the context of the invention, cyclic branched siloxanes of the DT type are used, preferably
a) mixtures of cyclic branched siloxanes of the D/T type which (preferably exclusively) consist of siloxanes having D and T units and whose cumulative proportion of D and T units present in the siloxane matrix and having Si-alkoxy and/or SiOH groups, determinable by $^{29}$Si NMR spectroscopy, is ≤2 mole percent, preferably less than 1 mole percent, and which preferably contain at least 5 percent by weight of siloxane cycles, such as preferably octamethylcyclotetrasiloxane ($D_4$), decamethylcyclopentasiloxane ($D_5$) and/or mixtures of these or else
b) mixtures of cyclic branched siloxanes having (preferably exclusively) D and T units whose cumulative proportion of D and T units present in the siloxane matrix and having Si-alkoxy and/or SiOH groups, determinable by $^{29}$Si NMR spectroscopy, is greater than 2 and less than 10 mole percent, this is a further preferred embodiment of the invention.

The provision of cyclic branched siloxanes of the DT type is set out by way of example in example 1.

The Brønsted acid which is particularly preferably to be used according to the invention is a perfluoroalkanesulfonic acid, in this case excluding the sole use of trifluoromethanesulfonic acid or of trifluoromethanesulfonic acid and acetic acid.

In terms of process engineering and economics, it is not preferable to add greater amounts of acetic acid to the reaction matrix consisting of siloxane raw materials and acetic anhydride, since this also has to be removed again at the latest during the further processing of the acetoxy group-bearing siloxane obtained. The process according to the invention is thus characterized in that acetic acid is added in amounts of 0.4 to 15.0 percent by weight, with preference 0.5 to 10.0 percent by weight, preferably 0.8 to 6.5 percent by weight, particularly preferably in amounts of 1.0 to 6.0 percent by weight, based on the reaction matrix comprising silanes and/or siloxanes bearing alkoxy groups, and/or silanes and/or siloxanes bearing acetoxy groups, and/or silanes and/or siloxanes bearing hydroxy groups and/or optionally simple siloxane cycles and/or DT cycles and acetic anhydride.

In a preferred embodiment of the invention, the reaction is conducted in the temperature range from preferably 140 to 160° C. and in a period of time of 4 to 8 hours.

If, for example, decamethylcyclopentasiloxane is reacted with acetic anhydride for 6 hours at 150° C. while adding 1.5 percent by weight of acetic acid and 0.6 percent by weight of concentrated sulfuric acid and the α,ω-diacetoxysiloxane obtained is derivatized thereafter to give the α,ω-diisopropoxysiloxane, the gas chromatography analysis performed thereon detects a total cycles content, defined as the sum total of the $D_4$, $D_5$, $D_6$ contents based on the siloxane matrix, of 59.6 percent by weight (example 5).

If, in contrast, decamethylcyclopentasiloxane and acetic anhydride are reacted for 6 hours at 150° C. while adding 6.0 percent by weight of acetic acid and 1.0 percent by weight of concentrated sulfuric acid and the α,ω-diacetoxysiloxane obtained is then derivatized to give the α,ω-diisopropoxysiloxane, the gas chromatography analysis performed thereon detects a total cycles content, defined as the sum total of the $D_4$, $D_5$, $D_6$ contents based on the siloxane matrix, of 10.3 percent by weight and thus substantiates complete equilibration.

It is also likewise possible, according to the invention, to allow the amount of acetic acid required for attaining the acidic equilibrating medium to react at least partly in situ, that is, for example by way of reaction of a siloxanol, for example an α,ω-siloxane diol, with an amount of acetic anhydride already provided to this end in the reactant starting weight, so that the appropriate amount of acetic acid is formed. This corresponds to a particularly preferred embodiment of the invention.

If, for example, a portion of the decamethylcyclopentasiloxane is replaced by an α,ω-siloxane diol, which as a chemical supplier of water converts a portion of the acetic anhydride into acetic acid, so that based on the total mixture 5.6 percent by weight of acetic acid and 0.6 percent by weight of concentrated sulfuric acid are present and the mixture is then allowed to react for 6 hours at 150° C., the gas chromatography analysis performed after the subsequent derivatization of the α,ω-diacetoxysiloxane obtained to give the α,ω-diisopropoxysiloxane detects a totals cycles content, defined as the sum total of the $D_4$, $D_5$, $D_6$ contents based on the siloxane matrix, of 14.1 percent by weight.

Furthermore, it is also possible according to the invention and corresponds to a very particularly preferred embodiment of the invention, to provide the Brønsted acid required for attaining the acidic equilibrating medium at least partly in situ, that is to say for example to provide it in situ by way of reaction of sodium triflate with concentrated sulfuric acid in the reaction matrix. This results in trifluoromethanesulfonic acid-sulfuric acid mixtures which in this case then represent the Brønsted acid used according to the invention. Brønsted acid salt-Brønsted acid combinations, such as preferably aluminium triflate/methanesulfonic acid, bismuth triflate/methanesulfonic acid and/or sodium triflate/methanesulfonic acid have likewise also proven themselves to be of particular worth according to the invention (cf. also example 6). The use of Brønsted acid salt-Brønsted acid combinations corresponds to a very particularly preferred embodiment of the invention. Within the context of this invention, a multiplicity of possible, usable Brønsted acid salt-Brønsted acid combinations therefore follow in an easily comprehensible manner for those skilled in the art.

A reaction system according to the invention, where the Brønsted acid originates from the in-situ combination of a Brønsted acid having a pKa ≤−1.30, preferably having a pKa ≤−2.90, particularly preferably having a pKa ≤−4.90, with the salt of a Brønsted acid in which the Brønsted acid present therein has a pKa ≤−1.30, preferably a pKa ≤−2.90, particularly preferably a pKa ≤−4.90, therefore corresponds to a preferred embodiment of the invention.

The employed indicator of equilibrium attainment is the total cycles content determined by gas chromatography and defined as the sum total of the $D_4$, $D_5$, $D_6$ contents based on the siloxane matrix and ascertained after derivatization of the branched siloxanes bearing acetoxy groups to give the corresponding branched siloxanes bearing isopropoxy groups, or of the α,ω-diacetoxypolydimethylsiloxanes to give the α,ω-diisopropoxypolydimethylsiloxanes. The derivatization to give the branched siloxanes bearing isopropoxy groups or to give the α,ω-diisopropoxypolydimethylsiloxanes is chosen here deliberately in order to prevent a thermally induced retrocleavage reaction of the branched siloxanes bearing acetoxy groups or of the α,ω-diacetoxypolydimethylsiloxanes which may take place under the conditions of analysis by gas chromatography (regarding the retrocleavage reaction, see inter alia J. Pola et al., Collect. Czech. Chem. Commun. 1974, 39(5), 1169-10 1176 and W. Simmler, Houben-Weyl, Methods of Organic Chemistry, Vol. VI/2, 4$^{th}$ Edition, O-Metal Derivates of Organic Hydroxy Compounds p. 162 ff.).

The invention further provides a process for preparing Brønsted-acidic, linear or branched acetoxy function-bearing siloxanes having chain lengths of more than 3 silicon atoms, wherein
  a) silanes and/or siloxanes bearing alkoxy groups, and/or
  b) silanes and/or siloxanes bearing acetoxy groups, and/or
  c) silanes and/or siloxanes bearing hydroxy groups, and/or
  d) simple siloxane cycles, especially comprising $D_4$ and/or $D_5$ and/or DT cycles,
are reacted with acetic anhydride, Brønsted acid and acetic acid,
wherein Brønsted acids having a pKa ≤−1.30, preferably having a pKa ≤−2.90, particularly preferably having a pKa ≤−4.90 are used and
and wherein
the acetic acid is present in amounts of 0.4 to 15.0 percent by weight, with preference 0.5 to 10.0 percent by weight, preferably 0.8 to 6.5 percent by weight, particularly preferably in amounts of 1.0 to 6.0 percent by weight, based on the reaction matrix,
wherein the molar ratio of Brønsted acid used to acetic acid
  in the case of Brønsted acids of category A), which have
    a pKa ≤−4.90, is in the range from ≥1/30 and ≤1/3 and
in the case of Brønsted acids of category B), which have a pKa of ≤−1.30 to ≥−4.80, is in the range from ≥1/10 and ≤1 and
in the case of mixtures of Brønsted acids of category A) and category B) is in the range from ≥1/30 and ≤1,
with the proviso that (i) either the sole use of trifluoromethanesulfonic acid and also of trifluoromethanesulfonic acid and acetic acid is excluded, and/or that (ii) the Brønsted acid used at least in part has a pKa between −1.3 and >−13.5, wherein the Brønsted acid is optionally at least partly provided in situ, preferably by use of a Brønsted acid salt-Brønsted acid combination, such as preferably aluminium triflate/methanesulfonic acid, bismuth triflate/methanesulfonic acid and/or sodium triflate/methanesulfonic acid.

A preferred embodiment of this process for preparing branched siloxanes bearing terminal acetoxy functions envisages that the component a) used is a branched silicone equilibrate bearing terminal alkoxy groups.

A preferred embodiment of this process for preparing branched siloxanes bearing terminal acetoxy functions envisages that all components a) and/or b) and also optionally c) and possibly d) are initially charged and reacted together with acetic anhydride, Brønsted acid and acetic acid.

A preferred embodiment of this process for preparing α,ω-diacetoxypolydimethylsiloxanes envisages that component c) is reacted, alone and/or optionally together with simple siloxane cycles, with acetic anhydride, Brønsted acid and acetic acid.

A preferred embodiment of this process envisages that it is conducted using a reaction system as described extensively above.

In the case of the SiOC-based polyethersiloxanes, there are especially, and in particular with the focus directed to very simply structured defoamers, also such active surfactants for which the very demanding aim of attaining the end-equilibrated state at the processing stage of the acetoxy group-bearing siloxane is not mandatorily required. For such, rather less demanding requirements, it is sufficient according to the invention to prepare acetoxy group-bearing siloxanes which have total cycles contents, defined as the sum total of the content fractions of the cyclic siloxanes comprising $D_4$, $D_5$ and $D_6$, based on the siloxane matrix and determined by means of gas chromatography after their derivatization to give the corresponding isopropoxysiloxanes, of less than 20 percent by weight, by a process as described above. This corresponds to a preferred embodiment of the invention. Clearly to those skilled in the art, achievable space-time yields for these production-related special cases are offset by the operational expenditure expected in order to remove, for example by distillation, the increased load of siloxane cycles in the further course of the processing.

Against this background, the invention further provides Brønsted-acidic, equilibrated (preferably end-equilibrated) linear α,ω-acetoxy group-bearing siloxanes having chain lengths of more than 3 silicon atoms, having total cycles contents, defined as the sum total of the content fractions of the cyclic siloxanes comprising $D_4$, $D_5$ and $D_6$, based on the siloxane matrix and determined by gas chromatography after their derivatization to give the corresponding linear α,ω-isopropoxysiloxanes, of less than 20, preferably less than 13, particularly preferably less than 12 percent by weight, preferably prepared by a process as described above.

Against this background, the invention further provides Brønsted-acidic, equilibrated (preferably end-equilibrated) branched acetoxy group-bearing siloxanes having chain lengths of more than 3 silicon atoms, preferably prepared by a process as described above, wherein they have total cycles contents, defined as the sum total of the content fractions of the cyclic siloxanes comprising $D_4$, $D_5$ and $D_6$, based on the siloxane matrix and determined by gas chromatography after their derivatization to give the corresponding branched isopropoxysiloxanes, of less than 20, preferably less than 8, particularly preferably less than 7 percent by weight.

The invention further provides for the use of acetoxy group-bearing siloxanes, prepared using a reaction system as described above, for preparing polyethersiloxanes, especially for preparing polyurethane foam stabilizers, defoamers, paint additives, levelling additives and dispersing additives and/or demulsifiers.

EXAMPLES

The following examples serve only to elucidate this invention for those skilled in the art and do not constitute any restriction whatsoever of the claimed subject matter. Determination of the water contents is performed in principle by the Karl Fischer method based on DIN 51777, DGF E-III 10 and DGF C-III 13a. $^{29}$Si NMR spectroscopy was used for reaction monitoring in all examples.

In the context of this invention, the $^{29}$Si NMR samples are analysed at a measurement frequency of 79.49 MHz in a Bruker Avance III spectrometer equipped with a 287430 sample head with gap width of 10 mm, dissolved at 22° C. in CDCl3 and against a tetramethylsilane (TMS) external standard [δ($^{29}$Si)=0.0 ppm].

GPCs (gel permeation chromatography) are recorded using THF as the mobile phase on an SDV 1000/10000A column combination having a length of 65 cm, ID 0.80, at a temperature of 30° C. using a SECcurity$^2$ GPC System 1260 (PSS Polymer Standards Service GmbH).

The gas chromatograms are recorded on a GC instrument of the GC 7890B type from Agilent Technologies, equipped with a column of the HP-1 type; 30 m×0.32 mm ID×0.25 µm dF (Agilent Technologies no. 19091Z-413E) and hydrogen as carrier gas, with the following parameters:

Detector: FID; 310° C.
Injector: split; 290° C.
Mode: constant flow, 2 ml/min
Temperature programme: 60° C. at 8° C./min-150° C. at 40° C./min-300° C. 10 min.

The employed indicator of equilibrium attainment is the total cycles content determined by gas chromatography and defined as the sum total of the $D_4$, $D_5$, $D_6$ contents based on the siloxane matrix and ascertained after derivatization of the branched siloxanes bearing acetoxy groups to give the corresponding branched siloxanes bearing isopropoxy groups, or of the α,ω-diacetoxypolydimethylsiloxanes to give the α,ω-diisopropoxypolydimethylsiloxanes. The derivatization to give the branched siloxanes bearing isopropoxy groups or to give the α,ω-diisopropoxypolydimethylsiloxanes is chosen here deliberately in order to prevent a thermally induced retrocleavage reaction of the branched siloxanes bearing acetoxy groups or of the α,ω-diacetoxypolydimethylsiloxanes which may take place under the conditions of analysis by gas chromatography (regarding the retrocleavage reaction, see inter alia J. Pola et al., Collect. Czech. Chem. Commun. 1974, 39(5), 1169-10 1176 and W. Simmler, Houben-Weyl, Methods of Organic Chemistry, Vol. VI/2, 4$^{th}$ Edition, O-Metal Derivates of Organic Hydroxy Compounds p. 162 ff.).

Unless stated otherwise, all figures are to be understood to be weight percentages.

Example 1 (Non-Inventive)

Preparation of a Cyclic Branched Siloxane having a Target D/T Ratio of 6:1

In a 10 l four-neck round-bottom flask with a precision glass stirrer and a reflux condenser on top, 783 g (4.39 mol) of methyltriethoxysilane are heated to 60° C. together with 978.7 g (2.64 mol) of decamethylcyclopentasiloxane while stirring, 2.98 g of trifluoromethanesulfonic acid are added and the mixture is equilibrated for 4 hours. 237 g of water and 59.3 g of ethanol are then added and the mixture is heated to reflux temperature for a further 2 hours. 159.0 g of water and 978.8 g (2.64 mol) of decamethylcyclopentasiloxane ($D_5$) are added and the reflux condenser is exchanged for a distillation bridge and the constituents that are volatile up to 90° C. are distilled off over the next hour. 3000 ml of toluene are then added to the reaction mixture and the water still present in the system is removed by distillation up to a bottoms temperature of 100° C. at the water separator.

The reaction mixture is allowed to cool to about 60° C., the acid is neutralized by addition of 60.0 g of solid sodium hydrogencarbonate, and the mixture is then stirred for a further 30 minutes to achieve complete neutralization. After cooling to 25° C., the salts are removed with the aid of a fluted filter.

At 70° C. and with an auxiliary vacuum of <1 mbar applied, the toluene used as solvent is distilled off. The distillation bottoms are a colorless mobile liquid, the $^{29}$Si NMR spectrum of which shows a D/T ratio of 6.2:1 (target 6.0:1). Based on the sum of the Si units detected by spectroscopy, the D and T units bearing Si-alkoxy and/or SiOH groups have a proportion of 0.52 mole percent. The gas chromatography analysis of the liquid also shows a proportion of about 15 percent by weight of simple siloxane cycles in the form of $D_4$, $D_5$ and $D_6$. The GPC has a broad molar mass distribution, characterized by Mw=55 258 g/mol; Mn: 1693 g/mol and Mw/Mn=32.63.

Example 2 (Inventive)

Preparation of an Acetoxy-Terminated, Branched Siloxane with 6.0% by Mass Acetic Acid Addition and 1.0% by Mass Sulfuric Acid Addition A 1000 ml four-neck flask with a precision glass stirrer, an internal thermometer and a reflux condenser on top is initially charged with 49.9 g (0.489 mol) of acetic anhydride together with 268.1 g of the DT cycles prepared in example 1 (D/T ratio according to $^{29}$Si NMR spectrum=6.18:1, M=525.42 g/mol and a proportion of SiOH/SiOEt groups of 0.52 mol %) and 188.5 g of decamethylcyclopentasiloxane ($D_5$) while stirring and this is admixed with 5.07 g of sulfuric acid (1.0% by mass based on the total mixture) and 30.4 g of acetic acid (6.0% by mass based on the mass of the reactants) and swiftly heated to 150° C. The initially slightly cloudy reaction mixture is left at this temperature for 6 hours with continued stirring. After cooling of the mixture, a colorless, clear, mobile liquid is isolated, the $^{29}$Si NMR spectrum of which substantiates the presence of Si-acetoxy groups in a yield of about 88.2%, based on the acetic anhydride used, and the complete disappearance of spectroscopically detectable proportions of Si-alkoxy and SiOH groups.

Conversion of the Branched Acetoxysiloxane into the Corresponding Branched Isopropoxysiloxane for Analytical Characterization Immediately after the synthesis, in a 250 ml four-neck round-bottom flask equipped with a precision glass stirrer, an internal thermometer, and a reflux condenser on top, 100.0 g of this Brønsted acidic, equilibrated branched acetoxysiloxane are mixed together with 23.2 g of a molecular sieve-dried isopropanol at 22° C. with stirring. Gaseous ammonia ($NH_3$) is then introduced to the reaction mixture until alkaline reaction (moist universal indicator paper) and the mixture is then stirred at this temperature for a further 45 minutes. The precipitated salts are separated off using a fluted filter. A colorless, clear liquid is isolated, the accompanying $^{29}$Si NMR spectrum of which substantiates the quantitative conversion of the branched acetoxysiloxane into a branched isopropoxysiloxane. An aliquot of this branched isopropoxysiloxane is withdrawn and analysed by gas chromatography. The gas chromatogram shows the following contents (reported in percent by mass):

| $D_4$ | $D_5$ | $D_6$ | Sum total ($D_4$-$D_6$) | Isopropanol content |
|---|---|---|---|---|
| 2.4% | 1.3% | 0.4% | 4.1% | 7.1% |

Taking the isopropanol excess into account, the contents of siloxane cycles ($D_4$, $D_5$ and $D_6$) are calculated here solely based on the siloxane proportion.

Example 3 (Inventive)

Preparation of an End-Equilibrated Acetoxy-Terminated, Linear Polydimethylsiloxane with 6.0% by Mass Acetic Acid Addition and with 1.0% by Mass Sulfuric Acid Addition:

A 1000 ml four-neck flask with a precision glass stirrer, an internal thermometer, and a reflux condenser on top is initially charged with 77.3 g (0.757 mol) of acetic anhydride together with 732.8 g (1.98 mol) of decamethylcyclopentasiloxane (D$_5$) and 48.6 g of acetic acid (6.0% by mass based on the total mass of the reactants) while stirring and this is admixed with 8.10 g of sulfuric acid (1.0 percent by mass based on the total mixture) and swiftly heated to 150° C. The initially slightly cloudy reaction mixture is left at this temperature for 6 hours with continued stirring.

After cooling of the mixture, a colorless, clear, mobile liquid is isolated, the $^{29}$Si NMR spectrum of which substantiates the presence of Si-acetoxy groups in a yield of about 93% based on acetic anhydride used corresponding to an α,ω-diacetoxypolydimethylsiloxane having an average total chain length of about 14.

Conversion of the α,ω-Diacetoxypolydimethylsiloxane into the Corresponding α,ω-Diisopropoxypolydimethylsiloxane:

Immediately after the synthesis, in a 250 ml four-neck round-bottom flask equipped with a precision glass stirrer, an internal thermometer, and a reflux condenser on top, 50.0 g of this Brønsted acidic, equilibrated α,ω-diacetoxypolydimethylsiloxane are mixed together with 11.3 g of a molecular sieve-dried isopropanol at 22° C. with stirring. Gaseous ammonia (NH$_3$) is then introduced to the reaction mixture until alkaline reaction (moist universal indicator paper) and the mixture is then stirred at this temperature for a further 45 minutes. The precipitated salts are separated off using a fluted filter. A colorless, clear liquid is isolated, the accompanying $^{29}$Si NMR spectrum of which substantiates the quantitative conversion of the α,ω-diacetoxypolydimethylsiloxane into an α,ω-diisopropoxypolydimethylsiloxane.

An aliquot of this α,ω-diisopropoxypolydimethylsiloxane is withdrawn and analysed by gas chromatography. The gas chromatogram shows the following contents (reported in percent by mass):

| D$_4$ | D$_5$ | D$_6$ | Sum total (D$_4$-D$_6$) | Isopropanol content |
| --- | --- | --- | --- | --- |
| 5.50% | 3.70% | 1.10% | 10.30% | 12.00% |

Taking the isopropanol excess into account, the contents of siloxane cycles (D$_4$, D$_5$ and D$_6$) are calculated here solely based on the siloxane proportion.

Example 4 (Non-Inventive)

Preparation of an End-Equilibrated Acetoxy-Terminated, Linear Polydimethylsiloxane with 1.5% by Mass Acetic Acid Addition and 0.2% by Mass Trifluoromethanesulfonic Acid Addition:

A 1000 ml four-neck flask with a precision glass stirrer, an internal thermometer, and a reflux condenser on top is initially charged with 77.3 g (0.757 mol) of acetic anhydride together with 732.8 g (1.98 mol) of decamethylcyclopentasiloxane (D$_5$) and 12.2 g of acetic acid (1.5% by weight based on the total mass of the reactants) while stirring and this is admixed with 1.62 g (0.88 ml) of trifluoromethanesulfonic acid (0.2 percent by mass based on the total mixture) and swiftly heated to 150° C. The initially slightly cloudy reaction mixture is left at this temperature for 6 hours with continued stirring.

After cooling of the mixture, a colorless, clear, mobile liquid is isolated, the $^{29}$Si NMR spectrum of which substantiates the presence of Si-acetoxy groups in a yield of about 93% based on acetic anhydride used corresponding to an α,ω-diacetoxypolydimethylsiloxane having an average total chain length of about 14.

Conversion of the α,ω-Diacetoxypolydimethylsiloxane into the Corresponding α,ω-Diisopropoxypolydimethylsiloxane for Analytical Characterization:

Immediately after the synthesis, in a 250 ml four-neck round-bottom flask equipped with a precision glass stirrer, an internal thermometer, and a reflux condenser on top, 50.0 g of this trifluoromethanesulfonic acid-acidified, equilibrated α,ω-diacetoxypolydimethylsiloxane are mixed together with 11.3 g of a molecular sieve-dried isopropanol at 22° C. with stirring. Gaseous ammonia (NH$_3$) is then introduced to the reaction mixture until alkaline reaction (moist universal indicator paper) and the mixture is then stirred at this temperature for a further 45 minutes. The precipitated salts are separated off using a fluted filter. A colorless, clear liquid is isolated, the accompanying $^{29}$Si NMR spectrum of which substantiates the quantitative conversion of the α,ω-diacetoxypolydimethylsiloxane into an α,ω-diisopropoxypolydimethylsiloxane.

An aliquot of this α,ω-diisopropoxypolydimethylsiloxane is withdrawn and analysed by gas chromatography. The gas chromatogram shows the following contents (reported in percent by mass):

| D$_4$ | D$_5$ | D$_6$ | Sum total (D$_4$-D$_6$) | Isopropanol content |
| --- | --- | --- | --- | --- |
| 4.94% | 4.04% | 1.07% | 10.06% | 11.00% |

Taking the isopropanol excess into account, the contents of siloxane cycles (D$_4$, D$_5$ and D$_6$) are calculated here solely based on the siloxane proportion.

Example 5 (Non-Inventive)

Preparation of an Acetoxy-Terminated, Linear Polydimethylsiloxane with 1.5% by Mass Acetic Acid Addition and with 0.6% by Mass Sulfuric Acid Addition:

A 1000 ml four-neck flask with a precision glass stirrer, an internal thermometer, and a reflux condenser on top is initially charged with 77.3 g (0.757 mol) of acetic anhydride together with 732.8 g (1.98 mol) of decamethylcyclopentasiloxane (D$_5$) and 12.2 g of acetic acid (1.5% by mass based on the total mass of the reactants) with stirring and this is admixed with 4.86 g of sulfuric acid (0.6 percent by mass based on the total mixture) and swiftly heated to 150° C. The initially slightly cloudy reaction mixture is left at this temperature for 6 hours with continued stirring.

After cooling of the mixture, a colorless, clear, mobile liquid is isolated, the $^{29}$Si NMR spectrum of which substantiates the presence of Si-acetoxy groups in a yield of about 90% based on acetic anhydride used corresponding to an α,ω-diacetoxypolydimethylsiloxane having an average total chain length of about 14.

Conversion of the α,ω-Diacetoxypolydimethylsiloxane into the Corresponding α,ω-Ddiisopropoxypolydimethylsiloxane Immediately after the synthesis, in a 250 ml four-neck round-bottom flask equipped with a precision glass stirrer, an internal thermometer, and a reflux condenser on top, 50.0 g of this Brønsted acidic α,ω-diacetoxypolydimethylsiloxane are mixed together with 11.3 g of a molecular sieve-dried isopropanol at 22° C. with stirring. Gaseous ammonia (NH$_3$) is then introduced to the reaction mixture until alkaline reaction (moist universal indicator paper) and the mixture is then stirred at this temperature for a further 45 minutes. The precipitated salts are separated off using a fluted filter. A colorless, clear liquid is isolated, the accompanying $^{29}$Si NMR spectrum of which substantiates the quantitative conversion of the α,ω-diacetoxypolydimethylsiloxane into an α,ω-diisopropoxypolydimethylsiloxane.

An aliquot of this α,ω-diisopropoxypolydimethylsiloxane is withdrawn and analysed by gas chromatography. The gas chromatogram shows the following contents (reported in percent by mass):

| $D_4$ | $D_5$ | $D_6$ | Sum total ($D_4$-$D_6$) | Isopropanol content |
|---|---|---|---|---|
| 1.80% | 56.6% | 1.20% | 59.60% | 13.00% |

Taking the isopropanol excess into account, the contents of siloxane cycles ($D_4$, $D_5$ and $D_6$) are calculated here solely based on the siloxane proportion.

Example 6 (Inventive)

Preparation of an End-Equilibrated Acetoxy-Terminated, Linear Polydimethylsiloxane with 1.5% by Mass Acetic Acid Addition and with 0.5% by Mass Sodium Triflate Addition and also 0.5% Methanesulfonic Acid Addition:

A 500 ml four-neck flask with a precision glass stirrer, an internal thermometer, and a reflux condenser on top is initially charged with 30.8 g (0.302 mol) of acetic anhydride together with 269.1 g (0.73 mol) of decamethylcyclopentasiloxane ($D_5$) and 4.5 g of acetic acid (1.5% by mass based on the total mass of the reactants) while stirring and this is admixed with 1.5 g of sodium triflate (0.009 mol) and 1.5 g of methanesulfonic acid (0.016 mol) and swiftly heated to 150° C. The initially slightly cloudy reaction mixture is left at this temperature for 6 hours with continued stirring.

After cooling of the mixture, a colorless, clear, mobile liquid is isolated, the $^{29}$Si NMR spectrum of which substantiates the presence of Si-acetoxy groups in a yield of about 91% based on acetic anhydride used corresponding to an α,ω-diacetoxypolydimethylsiloxane having an average total chain length of about 12.

Conversion of the α,ω-diacetoxypolydimethylsiloxane into the corresponding α,ω-diisopropoxypolydimethylsiloxane.

Immediately after the synthesis, in a 250 ml four-neck round-bottom flask equipped with a precision glass stirrer, an internal thermometer, and a reflux condenser on top, 50.0 g of this Brønsted acidic, equilibrated α,ω-diacetoxypolydimethylsiloxane are mixed together with 11.3 g of a molecular sieve-dried isopropanol at 22° C. with stirring. Gaseous ammonia ($NH_3$) is then introduced to the reaction mixture until alkaline reaction (moist universal indicator paper) and the mixture is then stirred at this temperature for a further 45 minutes. The precipitated salts are separated off using a fluted filter. A colorless, clear liquid is isolated, the accompanying $^{29}$Si NMR spectrum of which substantiates the quantitative conversion of the α,ω-diacetoxypolydimethylsiloxane into an α,ω-diisopropoxypolydimethylsiloxane.

An aliquot of this α,ω-diisopropoxypolydimethylsiloxane is withdrawn and analysed by gas chromatography. The gas chromatogram shows the following contents (reported in percent by mass):

| $D_4$ | $D_5$ | $D_6$ | Sum total ($D_4$-$D_6$) | Isopropanol content |
|---|---|---|---|---|
| 5.30% | 3.40% | 1.20% | 9.90% | 11.00% |

Taking the isopropanol excess into account, the contents of siloxane cycles ($D_4$, $D_5$ and $D_6$) are calculated here solely based on the siloxane proportion.

Example 7 (Inventive)

Preparation of an End-Equilibrated Acetoxy-Terminated, Linear Polydimethylsiloxane with 10% by Mass Acetic Acid Addition and with 5.0% by Mass Methanesulfonic Acid Addition:

A 500 ml four-neck flask with a precision glass stirrer, an internal thermometer, and a reflux condenser on top is initially charged with 22.7 g (0.222 mol) of acetic anhydride together with 230.2 g (0.62 mol) of decamethylcyclopentasiloxane ($D_5$) and 25.3 g of acetic acid (0.42 mol, 10.0% by mass based on the total mass of the reactants) while stirring and this is admixed with 12.6 g of methanesulfonic acid (0.13 mol, 5.0% by mass based on the total mass of the reactants) and swiftly heated to 140° C., with reflux conditions setting in. The initially slightly cloudy reaction mixture is left at this temperature for 6 hours with continued stirring.

After cooling of the mixture, a colorless, clear, mobile liquid is isolated, the $^{29}$Si NMR spectrum of which substantiates the presence of Si-acetoxy groups in a yield of about 93% based on acetic anhydride used corresponding to an α,ω-diacetoxypolydimethylsiloxane having an average total chain length of about 16.

Conversion of the α,ω-Diacetoxypolydimethylsiloxane into the Corresponding α,ω-Diisopropoxypolydimethylsiloxane:

Immediately after the synthesis, in a 250 ml four-neck round-bottom flask equipped with a precision glass stirrer, an internal thermometer, and a reflux condenser on top, 50.0 g of this Brønsted acidic, equilibrated α,ω-diacetoxypolydimethylsiloxane are mixed together with 11.3 g of a molecular sieve-dried isopropanol at 22° C. with stirring. Gaseous ammonia ($NH_3$) is then introduced to the reaction mixture until alkaline reaction (moist universal indicator paper) and the mixture is then stirred at this temperature for a further 45 minutes. The precipitated salts are separated off using a fluted filter. A colorless, clear liquid is isolated, the accompanying $^{29}$Si NMR spectrum of which substantiates the quantitative conversion of the α,ω-diacetoxypolydimethylsiloxane into an α,ω-diisopropoxypolydimethylsiloxane.

An aliquot of this α,ω-diisopropoxypolydimethylsiloxane is withdrawn and analysed by gas chromatography. The gas chromatogram shows the following contents (reported in percent by mass):

| $D_4$ | $D_5$ | $D_6$ | Sum total ($D_4$-$D_6$) | Isopropanol content |
|---|---|---|---|---|
| 5.05% | 3.98% | 1.10% | 10.13% | 12.00% |

Taking the isopropanol excess into account, the contents of siloxane cycles ($D_4$, $D_5$ and $D_6$) are calculated here solely based on the siloxane proportion.

The invention claimed is:
1. A reaction system for preparing acetoxy function-bearing siloxanes having chain lengths of more than 3 silicon atoms, comprising
   a) silanes and/or siloxanes bearing alkoxy groups and/or
   b) silanes and/or siloxanes bearing acetoxy groups, and/or
   c) silanes and/or siloxanes bearing hydroxy groups, and/or d) simple siloxane cycles and/or DT cycles, and also e) a reaction medium comprising acetic anhydride, Brønsted acid and acetic acid, wherein Brønsted acids having a pKa ≤−1.30 are used, and wherein the acetic acid is present in the reaction system in amounts of from 0.4 to 15.0 percent by weight, based on the reaction system, wherein the molar ratio of Brønsted acid used to acetic acid in the case of Brønsted acids of category A), which have a pKa ≤−4.90, is in the range from ≥1/30 and ≤1/3 and in the case of Brønsted acids of category B), which have a pKa of ≤−1.30 to ≥−4.80, is in the range from ≥1/10 and ≤1 and in the case of mixtures of Brønsted acids of category A) and category B) is in the range from ≥1/30 and ≤1, wherein the Brønsted acid used at least in part has a pKa between −1.3 and >−13.5.

2. The reaction system according to claim 1 for preparing branched siloxanes bearing terminal acetoxy functions, wherein silane and/or siloxane bearing alkoxy groups and containing at least one T and/or Q group, and/or silanes/siloxanes bearing acetoxy groups and containing at least one T and/or Q group, and/or DT cycles are used.

3. The reaction system according to claim 1, wherein linear and/or branched alkoxysiloxanes are used, those of the formula:

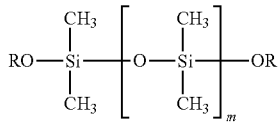

where m=1 to 300, or

or

wherein D is a dimethylsiloxy unit

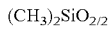

where a, b, c and d are each independently 1 to 100, and R=alkyl radical, branched alkyl radical, cycloalkyl radical having 1 to 10.

4. The reaction system according to claim 3, wherein the alkoxysiloxanes used result from acidic equilibration of dimethyldialkoxysilanes or methyltrialkoxysilanes with simple siloxane cycles.

5. The reaction system according to claim 1, wherein siloxane cycles are used, especially comprising $D_3$ (hexamethylcyclotrisiloxane), $D_4$ (octamethylcyclotetrasiloxane), $D_5$ (decamethylcyclopentasiloxane) and/or $D_6$ (dodecamethylcyclohexasiloxane).

6. The reaction system according to claim 1, wherein hydroxy-functional silanes and/or hydroxy-functional siloxanes have the formula

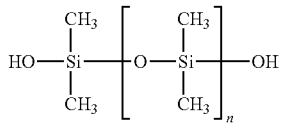

wherein n=1 to 300.

7. The reaction system according to claim 1, wherein the Brønsted acid required for the reaction system is at least partly provided in situ.

8. A process for preparing Brønsted-acidic, linear or branched acetoxy function-bearing siloxanes having chain lengths of more than 3 silicon atoms, wherein a) silanes and/or siloxanes bearing alkoxy groups, and/or b) silanes and/or siloxanes bearing acetoxy groups, and/or c) silanes and/or siloxanes bearing hydroxy groups, and/or d) simple siloxane cycles, comprising $D_4$ and/or $D_5$ and/or DT cycles, are reacted with acetic anhydride, Brønsted acid and acetic acid, wherein Brønsted acids having a pKa ≤−1.30, and wherein the acetic acid is present in amounts of 0.4 to 15.0 percent by weight, wherein the molar ratio of Brønsted acid used to acetic acid in the case of Brønsted acids of category A), which have a pKa ≤−4.90, is in the range from ≥1/30 and ≤1/3 and in the case of Brønsted acids of category B), which have a pKa of ≤−1.30 to ≥−4.80, is in the range from ≥1/10 and ≤1 and in the case of mixtures of Brønsted acids of category A) and category B) is in the range from ≥1/30 and ≤1, wherein the Brønsted acid used at least in part has a pKa between 31 1.3 and >−13.5, wherein the Brønsted acid is optionally at least partly provided in situ.

9. The process according to claim 8 for preparing branched siloxanes bearing terminal acetoxy functions, wherein the component a) used is a branched silicone equilibrate bearing terminal alkoxy groups.

10. The process according to claim 8 for preparing branched siloxanes bearing terminal acetoxy functions, wherein all components a) and/or b) and c) and d) are initially charged and reacted together with acetic anhydride, Brønsted acid and acetic acid.

11. The process according to claim 8 for preparing α,ω-diacetoxypolydimethylsiloxanes, wherein component c) is reacted, alone and/or together with siloxane cycles, with acetic anhydride, Brønsted acid and acetic acid.

12. The process according to claim 8, wherein the Brønsted acid has a pKa ≤−2.90, and wherein the acetic acid is present in amounts of from 0.5 to 10.0 percent by weight.

13. The reaction system according to claim 1, wherein the Brønsted acid has a pKa ≤−2.90 are used, and wherein the acetic acid is present in the reaction system in amounts of from 0.5 to 10.0 per cent by weight.

14. The reaction system according to claim 1, wherein the Brønsted acids has a pKa ≤−4.90 are used, and wherein the acetic acid is present in the reaction system in amounts of from 0.8 to 6.5 per cent by weight.

15. The reaction system according to claim 1, wherein the silanes bearing alkoxy groups are dimethyldialkoxysilanes, methyltrialkoxysilanes and/or alkyl orthosilicates $Si(OR)_4$, wherein R=ethyl-.

* * * * *

UNITED STATES PATENT AND TRADEMARK OFFICE
CERTIFICATE OF CORRECTION

PATENT NO.         : 11,420,985 B2
APPLICATION NO.    : 16/849106
DATED              : August 23, 2022
INVENTOR(S)        : Wilfried Knott, Horst Dudzik and Philippe Favresse It is certified that error appears in the above-identified patent and that said Letters Patent is hereby corrected as shown below:

In the Claims

Column 18,
Line 12, "siloxane cycles, comprising" should read -- siloxane cycles comprising --.
Line 32, "between 31 1.3 and" should read -- between 1.3 and --.

Signed and Sealed this
Twentieth Day of September, 2022

Katherine Kelly Vidal
*Director of the United States Patent and Trademark Office*